(12) United States Patent
Billarant et al.

(10) Patent No.: US 8,962,121 B2
(45) Date of Patent: Feb. 24, 2015

(54) ASSEMBLY MADE UP OF A COVER AND OF A MOLDED ARTICLE INCLUDING A PLURALITY OF OVERMOLDED ELEMENTS HAVING HOOKS

(75) Inventors: Fabrice Billarant, Reze (FR); Marc Woodling, Charlotte, NC (US)

(73) Assignee: APLIX, Paris (FR)

( * ) Notice: Subject to any disclaimer, the term of this patent is extended or adjusted under 35 U.S.C. 154(b) by 191 days.

(21) Appl. No.: 13/574,127

(22) PCT Filed: Jan. 12, 2011

(86) PCT No.: PCT/FR2011/000015
§ 371 (c)(1),
(2), (4) Date: Nov. 15, 2012

(87) PCT Pub. No.: WO2011/089333
PCT Pub. Date: Jul. 28, 2011

(65) Prior Publication Data
US 2013/0071606 A1    Mar. 21, 2013

(30) Foreign Application Priority Data
Jan. 20, 2010    (FR) ...................................... 10 00217

(51) Int. Cl.
*B32B 3/06* (2006.01)
*B60N 2/58* (2006.01)

(52) U.S. Cl.
CPC ................ *B32B 3/06* (2013.01); *B60N 2/5833* (2013.01)

USPC ............................................ 428/100; 428/99

(58) Field of Classification Search
CPC ...................................................... B60N 2/5833
USPC ..................... 428/100, 99; 297/452.6, 228.13
See application file for complete search history.

(56) References Cited

U.S. PATENT DOCUMENTS

| 4,776,636 A | 10/1988 | Pyle et al. |
| 2003/0162008 A1 | 8/2003 | Cappucci et al. |
| 2003/0215601 A1 | 11/2003 | Pedde et al. |
| 2010/0044940 A1 | 2/2010 | Gilardi |

FOREIGN PATENT DOCUMENTS

| JP | 20105183 A | 1/2010 |
| WO | 0137710 A1 | 5/2001 |
| WO | 2008037453 A1 | 4/2008 |

*Primary Examiner* — Alexander Thomas
(74) *Attorney, Agent, or Firm* — The Webb Law Firm (57) ABSTRACT

An assembly comprising a molded article and a cover that covers the molded article, a longitudinal groove being formed in the molded article while being open to the outside, two elements having hooks being overmolded in the molded article so as to form the bottom of the groove at least in part, the hooks penetrating into openings in loops stemming from the cover so as to hook therein and thereby fasten the cover to the molded article, and at least two overmolded elements having hooks are provided that form the bottom of the trench at least in part by being placed one behind the other in the longitudinal direction, the two elements having hooks being separated from each other by an intermediate zone in which there is no element having hooks, and means are provided for preventing the cover from riding up towards the top of the trench.

15 Claims, 6 Drawing Sheets

ASSEMBLY MADE UP OF A COVER AND OF A MOLDED ARTICLE INCLUDING A PLURALITY OF OVERMOLDED ELEMENTS HAVING HOOKS

BACKGROUND OF THE INVENTION

1. Field of the Invention

The present invention relates to an assembly comprising a molded article, in particular a motor vehicle cushion, at least two elements having hooks overmolded in the molded article, and a cover that covers the molded article at least in part, the cover being fastened to the molded article via a self-fastener or "touch fastener" device of the hook-and-loop type or of the hook-in-hook type, hooks stemming from the overmolded elements having hooks and co-operating with loops or hooks stemming from the cover to achieve the fastening.

2. Description of Related Art

Document US 2003/0162008 discloses an assembly comprising a molded article having an outside surface and a cover that covers the outside surface, a groove or trench being formed in the molded article while having two opposite side faces meeting to form a trench bottom, an overmolded element having two catches being placed at the bottom of the trench and a wire secured to the cover being inserted in the trench and co-operating by abutment or clipping with the respective catches to hold the cover around the molded article.

That type of assembly is complicated to manufacture, in particular for suitably positioning the catches proud from the side walls of the trench, and the resulting fastening is not as reliable as the fastening obtained by fastening using a hook-and-loop self-fastener. In addition, once the wire has been clipped between the catches, it is very difficult, or indeed impossible, to unfasten it without damaging the cover.

In the prior art, assemblies comprising a molded article and a cover are known in which the molded article is provided with a groove or with a trench formed in its outside surface and having two side faces that meet at a bottom, from which hooks project and co-operate with loops stemming from the cover. Such assemblies including a hook-and-loop system for fastening the cover are more reliable than those described in US 2003/0162008 but they are also most costly and, in particular, it is necessary to cover substantially the entire bottom with hooks in order to make the fastening sufficiently resistant to pull-out forces. In particular, the hooks are part of elements having hooks that are placed at the bottom of the trench, the elements having hooks being aligned continuously, i.e. end-to-end, thereby making the assembly costly to manufacture, because said elements having hooks are very costly.

In a first aspect, an object of the present invention is to overcome the drawbacks of the prior art by proposing an assembly made up of a molded article and of a cover that, although it has hook-and-loop fastening (making it very simple to fit the cover around the molded article and, in particular, making it possible to unfasten the fastening and to refasten it if necessary, e.g. with a view to repositioning the cover), is less costly to manufacture, without however losing its reliability and its pull-out strength that are imparted by using a hook-and-loop self-fastener for fastening the cover.

SUMMARY OF THE INVENTION

In this first aspect, the invention provides an assembly comprising a molded article and a cover that covers the outside surface of the molded article at least in part, at least one longitudinal groove or trench being formed in the molded article while being open to the outside, at least one element having hooks being overmolded in the molded article so as to form the bottom of the groove at least in part, some hooks and preferably the hooks penetrating into openings in loops stemming from the cover so as to hook therein and thereby fasten the cover to the molded article, said assembly being characterized in that:

at least two overmolded elements having hooks are provided that form the bottom of the trench at least in part by being placed one behind the other in the longitudinal direction, the two elements having hooks being separated from each other by an intermediate zone in which there is no element having hooks; and means are provided for preventing the cover from riding up towards the top of the trench, in particular at the or at each intermediate zone.

Thus, in the invention, hook-and-loop self-fasteners are used for fastening the cover around the article but in a smaller quantity, thereby having a very favorable effect on the cost, without, however, adversely affecting the great simplicity with which the assembly can be manufactured and fitted, or the reliability of the fastening, in particular without adversely affecting its pull-out strength, which is preserved or indeed improved by the anti-ride-up means.

Preferably, the loops stem from the outside surface of a pocket fastened to the cover, and the means for preventing the riding-up effect are constituted by a wire that extends inside the pocket.

Thus, compared to the prior art in which hook-and-loop systems are also provided for fastening the cover to the molded article, fewer hooks are provided, thereby considerably reducing the costs, and, instead, the rigid wire is provided, which wire is made in particular of a thermoplastic material, which is must less costly but that nevertheless makes it possible to obtain upward pull-out strength that is as good or even better. In addition, with a trench that does not extend straightly, but rather that includes curved portions, it is possible, nonetheless, to use straight overmolded elements, adapting them to match the curved portions being facilitated by the fact that they can be spaced apart from one another and do not need to be placed continuously over the entire length over which the trench extends, which elements would otherwise need to have corresponding curved shapes.

Preferably, the loops stem from the bottom portion of the periphery of the pocket, in particular from this portion only.

In an improvement, the length of the intermediate zone, i.e. the distance between the two successive adjacent overmolded elements in the longitudinal direction is such that, without the wire, a riding-up effect appears; and the material and the dimensions of the wire are such that it is sufficiently rigid for the riding-up effect to be smaller when it is received in the pocket, and, in particular, for there no longer to be any riding-up effect.

In a preferred embodiment, in cross-section, each overmolded element having hooks has a U-shape or a C-shape, the two branches of which shape extend towards the outside of the groove, the inside surface of the U-shape or of the C-shape having two distal end segments from which no hook projects, and an intermediate bottom segment from which the hooks of the overmolded element having hooks project.

In an advantageous embodiment, the groove has two side faces formed by the material of which the molded article is molded, which faces extend from the outside to the respective top or distal edges of the branches of the U-shape or of the C-shape of each element having hooks and the respective inside surfaces of the two branches of the U-shape or of the C-shape are flush with the respective side faces.

In particular, the side faces of the groove are vertical and come into register with the inside top edges of the respective branches of the U-shape or of the C-shape.

In a preferred embodiment, the groove includes at least one segment of curved shape in which at least one overmolded element extends that is of straight or curved shape, the length of the overmolded element being less than the length of the curved segment.

Preferably, the width of the groove is defined as being the shortest distance between two of its facing walls, and in particular when the elements having hooks are aligned in a given direction, the width of the trench is measured perpendicularly to said given direction, and the width dimension of the element having loops, i.e. the sum of the width dimension of the wire and of twice the thickness of the pocket, is substantially equal to the width of the trench, while nevertheless being just less than said width of the trench.

Preferably, the distance between the respective innermost points of the top edges of the two branches of the U-shape or of the C-shape of each overmolded element is substantially equal to the width dimension of the element having loops excluding the loops, i.e. the sum of the width dimension of the wire and of twice the thickness of the pocket, while nevertheless being just greater than this width dimension.

Preferably, the pocket is fastened to the cover, in particular by being sewn thereto, at the superposition of two edges of two pieces or sheets of the cover.

Preferably, the intermediate distance between the at least two overmolded elements having hooks is greater than 50% of the largest dimension, in particular the length dimension, of each overmolded element, and is preferably greater than the largest length dimension of each overmolded element.

Preferably, the distance between the at least two overmolded elements is greater than 20 millimeters (mm), in particular greater than 100 mm, and in particular lies in the range 100 mm to 500 mm.

Preferably, the wire has a cross-section that is of oval shape, and in particular the major axis of the oval shape extends in the direction going from the bottom of the trench outwards, i.e. substantially perpendicular to the base of each overmolded element.

In a particularly preferred embodiment, the wire has a square or rectangular cross-section, the corners of which are rounded, and in particular the length, when the wire has a rectangular cross-section, extends in the direction going from the bottom of the trench towards the outside.

In a second aspect of the invention, independent from the first aspect and forming an invention in itself, the overmolded elements having hooks are overmolded by using a unit comprising firstly at least one overmolded element having hooks, in particular at least two elements having hooks, designed to be overmolded in a molded article, the element or each element forming an open internal space defined by two end side walls and a bottom, from which one or more hooks stemming from the element project, and secondly a mold having its internal wall(s) defining an internal volume that is the same shape as the article to be formed by molding in the mold, at least one pedestal projecting into the internal volume from said inside wall(s), the overmolded element being in contact with the pedestal while the molding foam is being cast, the pedestal including a rail-shaped portion having two opposite outer side faces, which are, in particular, parallel faces, this aspect being characterized in that, while the foam is being cast, the respective end side walls of the overmolded element are in contact with the respective opposite outer side faces, in particular along at least one respective contact line on either side, without hooks being interposed between them, and in particular without the hooks being interposed between them.

The pedestal is clamped between the two side walls, so that said side walls bear against the two side faces, in particular in resilient manner, so as to provide sealing from the liquid foam being poured into the inter-sidewall space including the hook(s).

Such a use is particularly favorable because the combination of the narrow trench obtained using this unit, of overmolded elements of such a unit, and of an element having loops of the invention, makes it possible to provide the bottom of the trench with fewer overmolded elements having hooks than in the prior art, without however having to suffer the riding-up effect. However, it is also possible to use conventional elements having hooks, i.e., in particular such elements without side walls or having cocoons for protecting the hooks, while also remaining within the field protected by the invention.

In a preferred embodiment, the element having hooks clamps the pedestal between its two side walls with force.

In an improvement, the contact between the element having hooks and the pedestal takes place by clipping.

In a preferred embodiment, each side wall of the element having hooks has an innermost end edge, the height of the highest point of the hooks being less than the height of the innermost end edges; and the pedestal includes a rail-shaped portion having two opposite outer side faces that are spaced apart and that have shapes that are substantially identical to the shapes of the end edges of the side walls of the overmolded element, and a thickness of the rail, i.e. a distance between the two side faces measured in a given direction, being just greater than a distance between the two end edges of the two side walls in said given direction.

Preferably, the innermost end edges of the two side walls are straight in shape, preferably being mutually parallel, and, as seen in plan from above, the two outer side faces of the rail have the same straight shape, so that said respective contact lines are straight.

Preferably, the two side walls are inclined slightly towards each other, in particular by having, as seen in cross-section, a hook shape, a C-shape, a circularly arcuate shape, or an analogous shape.

Preferably, the overmolded element also has a front wall and a back wall, which walls extend transversely relative to the side walls.

Preferably, the respective top edges of the front and back walls are at respective heights greater than the highest point of the hooks, but less than the heights of the top edges of the two side walls.

In a preferred embodiment, one or more sealing ribs are provided that extend along the top edge(s) of the front and back walls.

Preferably, the pedestal has a top having a shape that is substantially complementary to the shape of the top edges of the front and back walls, so that it can come to rest against the top edges of the walls, optionally with sealing gaskets being interposed that extend along the two top edges of the front and back walls.

The open internal space within which the hooks lie is thus closed completely, and the hooks are then particularly well protected from the foam firstly at the contacts between the two side faces of the rail and the two side walls of the overmolded element, and secondly at the front and back walls and at the top of the rail.

In another embodiment, each innermost top edge forms a curved line, in particular a circularly arcuate line, and, as seen in plan from above, the two side faces have shapes identical to said curved lines, said respective lines of contact being constituted by said curved lines.

Preferably, the overmolded element extends outwards beyond the two side walls, thereby forming one or more outside brims.

In the finished molded article, these two brims are totally surrounded by foam, and this anchoring in the foam procures excellent strength for the fastening of the overmolded element to the molded article. In particular, when the overmolded element is an overmolded element that is clipped over the pedestal in such a manner as to clamp it before the foam is poured in, the good anchoring of the molded article in the foam at the end of molding guarantees that the overmolded element remains properly bonded to the molded article while the overmolded element (which is then anchored as overmolded in the molded article) is being unclipped from the pedestal.

Good anchoring of the overmolded element in the foam of the molded article is facilitated even further by the fact that, when the overmolded element has two side walls between which the hooks are situated, the foam is in contact with the entire top surfaces of the side walls. The width of the trench is then equal to the distance between the two top inside edges of the two side walls.

Preferably, one or each side wall has an outside rib, the rail having its greatest thickness at each rib or at said ribs, the two ribs being in particular at the same level, and said thickness of the rail being the distance between the two outermost points of said two ribs.

The invention also provides a molded article having a main body made of molding material, in particular of a thermoplastic foam, and one or more overmolded elements having hooks that are overmolded in the molded main body, the foam being in contact with the overmolded element, in cross-section over the entire periphery of the overmolded element, with the sole exception of a region corresponding to the internal space so that a groove is formed that opens out to the outside of the molded body, the groove in particular having a shape complementary to the shape of a rail having one or more thicknesses corresponding to the distance(s) between the two inside top edges of the two side walls of the pedestal.

When a plurality of overmolded elements are provided, i.e. within the ambit of the first aspect of the invention, the overmolded elements are separated from one another by hook-free intermediate zones.

The present invention also provides a method of manufacturing a molded article of an assembly of the invention, which method may include the steps that consist in taking a mold having the same shape as the article that is to be molded, a rail-shaped pedestal projecting from a wall of the mold defining the volume of the mold, said method being characterized by the step that consists in clamping the pedestal by one or more overmolded elements, each having two side walls that are spaced apart and a bottom from which the hooks project, so that the two side walls of the element having hooks come to bear against two faces of the pedestal along at least two respective lines of contact without hooks being interposed between them, in such a manner as to seal off the internal space between the two walls of the overmolded element, and in pouring the foam for molding the article.

In a third aspect, independent from the first two aspects, forming an invention in itself and being suitable for being used in combination with either of the other two aspects, or with both of the other two aspects, the present invention also provides an overmolded element having hooks, in particular designed to be part of an assembly in the first aspect of the present invention.

The overmolded element having hooks including two side walls that are spaced apart from each other and a bottom in such a manner as to form an open internal space having a largest width measured in a direction extending from one wall to the other, in particular perpendicularly to the two walls, and at least one hook, and preferably a plurality of hooks, stemming from the bottom, is characterized in that the top or distal portions of the two side walls are inclined relative to each other so that the distance between the two innermost points of the top edges of the two walls is less than said largest width.

Preferably, in cross-section through the walls, the bottom is substantially circularly arcuate in shape, in particular in the zone from which the hooks stem.

Preferably, the hooks of the overmolded element project from the bottom only of the internal space.

BRIEF DESCRIPTION OF THE DRAWINGS

An embodiment of the invention is described below with reference to the drawings, in which.

DETAILED DESCRIPTION OF THE PREFERRED EMBODIMENTS

Figure 1:
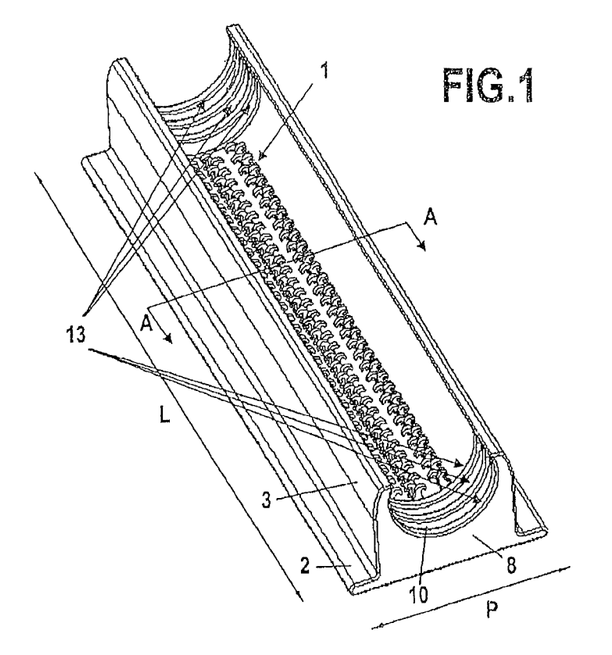
FIG. 1 is a perspective view from above of an overmolded element having hooks for an assembly that can be used in the invention.

In the figures, and in particular in FIG. 1, a perspective view is shown of an overmolded element having hooks in a third aspect of the present invention and that can be implemented in the first and/or second aspects of the present invention. The element 1 is designed to be placed in a mold to form a molded article by molding, the article to be molded being made of a molding material, in particular of a foam, and more particularly of a thermoplastic foam. When the foam is poured into the mold, said foam comes in liquid manner into contact with overmolded element, and then, by setting, fastens to the overmolded element. When the foam is poured into the mold, the aim is for the hooks to be protected so that the foam does not come to pollute them by penetrating under the hooks, because, once the foam is under the hooks, they become unusable and can no longer co-operate with the loops to perform their hooking and hook-in-loop fastening function.

Figure 9:
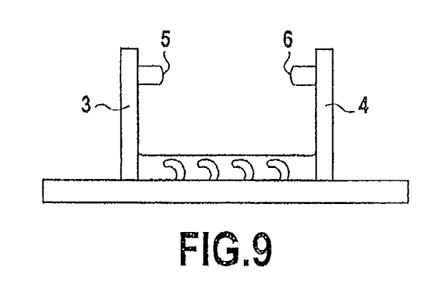
FIG. 9 diagrammatically shows another embodiment of an overmolded element having hooks in a cross-section view identical to the FIG. 2 view.

The overmolded element 1 includes a plate 2 having a rectangular base of long length L and of width l. The length L extends in the longitudinal direction of the overmolded element while the width l extends in the transverse direction. Two side walls 3 and 4 extend from the top side of the plate 2. Each of these side walls 3 and 4 has a top edge, which, in this example, is constituted by a surface that is substantially horizontal to the figure, and each top edge has a line 5 and 6 made up of the points of the top edge that are innermost, i.e. that are closest to the other wall. In cross-section, in particular as in FIG. 2, each of these lines 5 and 6 forms a respective innermost point. These two lines 5 and 6 are straight in this example. In another embodiment, shown in FIG. 9, these top edges are not necessarily plane surfaces, and may be stepped. Thus, in FIG. 9, the top edge has a horizontal first face (corresponding to the top surface of the wall 3 excluding the rib) followed by a second horizontal face (the top face of the rib), stepped relative to the first face and ended by a curved portion extending from the innermost point of the second horizontal face to the innermost point of the curved portion that corresponds to the innermost point of the top edges of the walls 3 and 4.

Figure 2:
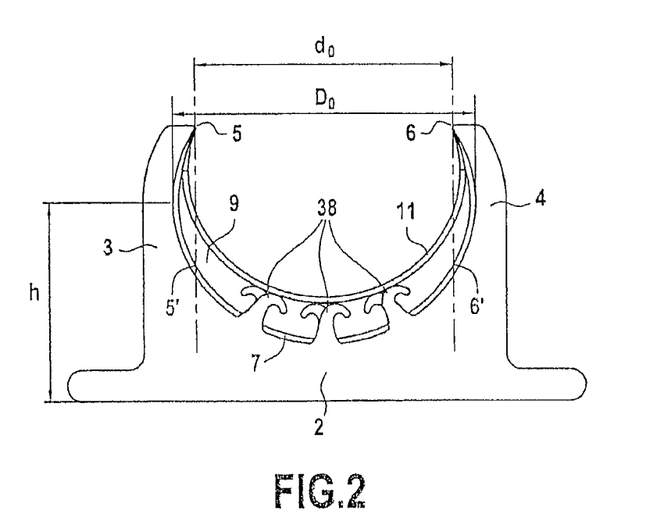
FIG. 2 is a section view on line A-A of FIG. 1.

Thus, in cross-section, and in particular in section on A-A of FIG. 1, and as shown in FIG. 2, the overmolded element is substantially U-shaped or C-shaped, the branches of the U-shape or of the C-shape being constituted by the two walls 3 and 4.

The inside surface of the U-shape or of the C-shape is made up of three segments, namely two end segments, each of which extends from the innermost point 5, or from the innermost point 6, to a bottom intermediate segment that is defined by the outermost hooks 38 on either side. Thus, in the two end segments, there are no projecting hooks, and all of the hooks of the overmolded element project from the bottom intermediate segment.

In order to define the bottom of an overmolded element of the present invention with precision, a first definition method consists in considering the hooks and in defining the bottom as being the smallest surface defining the internal space within which all of the hooks lie.

A second method consists, in each cross-section, in projecting the two innermost points (5 and 6) vertically (i.e. perpendicularly to the plane of the base plate in FIG. 2, for example) onto the inside surface defining the internal space so as to obtain the two projected points 5' and 6' between which it is considered that the bottom extends.

In order to define the bottom of an overmolded element of the invention, it is possible to use either one of the two methods.

In FIGS. 1 and 2, the distal end portions ending at the end points 5 and 6 of the side walls 3 and 4 are inclined slightly towards each other. Thus, in cross-section, e.g. at the section A-A, the overmolded element 1 defines an open U-shaped or an open C-shaped internal space defined by the two walls 3 and 4 and by the top face of the plate 2. As shown, this internal space preferably has a floor 7 (the top face of the plate) corresponding to the above-defined intermediate segment. The hooks 38 project from this floor 7. Said hooks 38 can be arranged in any manner that is desired, and preferably, as shown, they are arranged in rows and in columns, in particular as shown with, in any given column, their heads pointing towards the left and towards the right of the figure in alternation.

The longest distance $D_0$, measured in the direction perpendicular to the walls, i.e. in the direction horizontal to FIG. 2, is the distance between the two walls at the height h. It is greater than the distance $d_0$ between the two end edges. The same relationship is verified in the embodiment shown in FIG. 9. In FIG. 2, the embodiment is such that the cross-section is the same for all of the cross-sections along the longitudinal direction between the front and back walls 9 and 10, because the walls and the edges are straight in this example. However, it is possible to consider an embodiment in which said cross-section varies, e.g. in which the walls and the edges have a certain amount of curvature seen in plan from above, e.g. circularly arcuate or oval curvature, or curvature of any other imaginable shape. The relationship that $D_0$ is greater than $d_0$ is then valid in each cross-section.

The overmolded element also has a front wall and a back wall 8 and 9. The front and back walls 8 and 9 and the side walls 3 and 4 and the bottom floor 7 define the open internal space within which the hooks lie. Each front and back wall 8 and 9 has a respective top edge 10 and 11 that extends from one side edge 5 to the opposite other side edge 6. These edges 10 and 11 are C-shaped in this example. Sealing gaskets 13 extend along the top edges 10 and 11 of the front and back walls 8 and 9.

Seen from above, the inside top edges of the walls 8 and 9 are straight lines. These lines may be otherwise than straight and have any shape whatsoever, in particular by having one or more curved portions.

The above-described element 1 is designed to be placed in a mold, into which liquid foam is poured, which, by setting, is fastened to the side walls 5 and 6 and to the bottom surface of the plate 2 and to the outside faces of the front and back walls 8 and 9, so as thus to fasten the hooks to the molded foam article.

Inside the mold, at least one pedestal 12 in the shape of a rail projects from the inside wall 16 of the mold that defines the volume having the shape of the article that is to be manufactured by molding. It is possible to provide one or more pedestals as a function of the number of trenches that are to be formed in the finished molded article in order to place hooks therein. In particular, it is possible to provide an array of pedestals that form an array of trenches, and some of them may be curved. In order to prevent the foam from being poured over the hooks, or from coming into contact therewith, the hooks should be protected from coming into contact with the poured foam while said foam is being poured in. To this end, the overmolded element(s) having hooks is/are clipped or clamped with force over the pedestal(s), with the hooks facing towards the pedestal. Over any given pedestal, it is possible to place a single overmolded element or to place a plurality of them, one behind the other, in which case they can either be placed some distance apart from one another, as in the first aspect of the invention, or very close together, or else indeed end-to-end if so desired.

The rail 12 has two opposite side faces 30 and 31. Seen from above, i.e. seen looking along the arrow F of FIGS. 4 and 5, these faces are in the shape of straight lines. They can thus have the same shape as the inside top edges 5 and 6 of the two side walls 3 and 4.

The distance D between the two faces 30 and 31, as measured in the direction (horizontal to the figure) perpendicular to the two faces 30 and 31, which direction corresponds to the thickness of the rail, is substantially equal to, while being slightly greater than, the distance $d_0$, measured in the same direction between the two top edges 5 and 6 of the side walls 3 and 4.

Figure 4A:
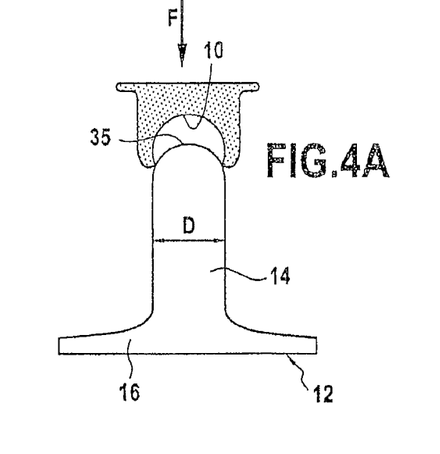
FIGS. 4A and 4B are side views showing the overmolded element having hooks of FIGS. 1 and 2, and respective pedestals, each of which is in the shape of a rail over which the overmolded element having hooks is positioned.
Figure 5A:
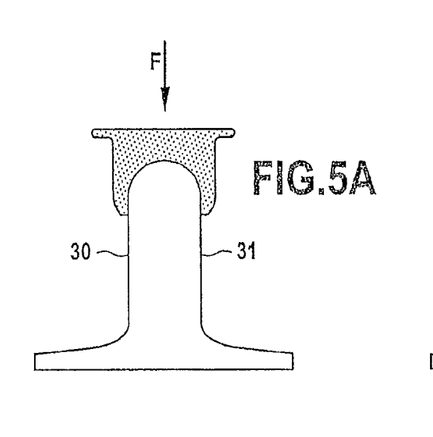
FIGS. 5A and 5B are views similar to the views of FIGS. 4A and 4B, but showing the state in which the respective rail-shaped pedestal is inserted with force (in the manner of a clip) in such a manner as to protect, in sealed manner, the internal space for receiving the hooks inside the overmolded element having hooks, the assembly of FIG. 5A corresponding to the molded article of FIG. 3A, and the assembly of FIG. 5B corresponding to the molded article of FIG. 3B.

When the rail does not have a constant thickness along the longitudinal direction (perpendicular to the plane of FIG. 4 or 5) along which it extends, the thickness D measured in each cross-section is substantially equal to, while nevertheless being slightly greater than, the distance $d_0$ between the two innermost end edges 5 and 6 at the level (along the longitudinal direction) where the measurement is taken, the shapes of the faces of the rail being complementary to the shapes of the end edges. Thus, for example, it is possible to provide a circular arc shape rather than a straight shape for the edges 5 and 6 and for the faces 30 and 31, the important thing being that the faces and the edges have substantially the same shape in order to provide sealing from the foam when the rail is inserted between the side walls.

Figure 5B:
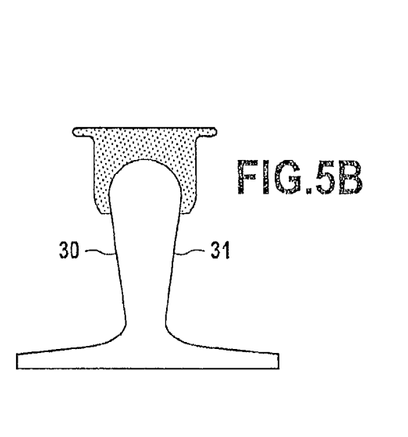

As shown in FIGS. 5A and 5B, when the overmolded element 1 is in contact with the faces 30 and 31 of the pedestal 12 during the molding, this contact takes place over at least the straight lines defined by the end edges 5 and 6. In the embodiment shown, this contact takes place over planes containing these lines.

In addition, the rail 12 has a top portion of shape complementary to the shape of the top edges 10 and 11 of the front and back walls 8 and 9. Thus, in this example, the top of the rail 12 is C-shaped or is circularly arcuate in shape corresponding to the C-shape or to the circularly arcuate shape of the top edges of the front and back walls 8 and 9. By coming to press the element 1 so that its two side walls come to clamp the pedestal 12 between their two edges 5 and 6, these two edges are moved slightly apart from each other so as to enable the rail to pass into it until its top 35 comes into contact with the two top edges 10 and 11 of the side walls 8 and 9. The resilience of the two top end edges means that they provide sealing where they come into contact with the corresponding faces of the rail, since the two walls tend to return towards each other by resilience, while the sealing ribs 13, which find themselves between the top of the rail 12 and the top edges of the walls 8 and 9, provide excellent sealing for the hooks while the foam is being poured in.

Figure 10:
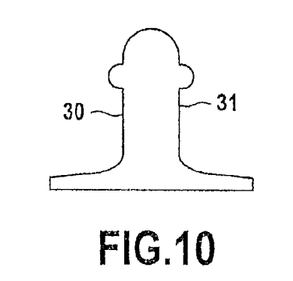
FIG. 10 is another possible embodiment of a pedestal of an assembly of the invention in a view identical to FIG. 4 or FIG. 5.

In an improvement shown in FIG. 10, it is possible to provide two ribs that project laterally from the two opposite side faces 30 and 31 of the rail. The largest width of the rail in any given cross-section is the distance D between the two outermost points of the two ribs, and this distance D is greater than the distance $d_0$.

Figure 16:
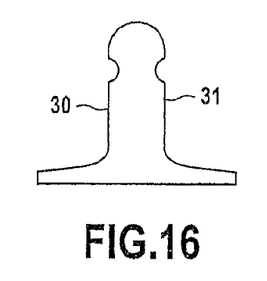
FIG. 16 is another possible embodiment of a pedestal of an assembly of the invention in a view identical to FIG. 4 or FIG. 5.
Figure 17:
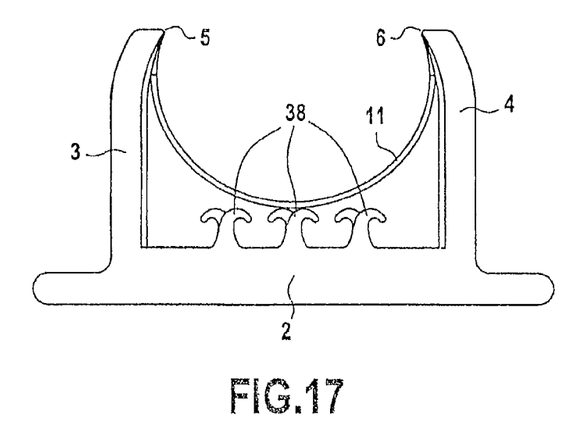
FIG. 17 is a section view identical to the FIG. 2 view showing another embodiment of an overmolded element having hooks that has a flat bottom from which the hooks stem.

In another embodiment shown in FIG. 16, it is possible to provide two longitudinal channels in the two opposite side faces 30 and 31, which channels are designed to receive the end side edges by snap-fastening.

The above-described two embodiments are improvements using clipping or snap-fastening. However, they are not necessary per se to obtaining the effect of the invention, which effect is obtained whenever a pedestal is inserted between the two side walls with mutual contact being maintained, e.g. by the fact that the two walls that have been moved apart outwards tend to return inwards while bearing against the rail.

Figure 3A:
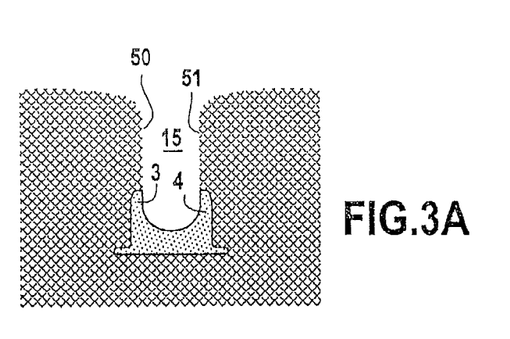
FIGS. 3A, 3B, and 3C are section views of portions of respective molded articles of the invention, each of which includes the overmolded element of FIGS. 1 and 2.

Once the foam has been cast and said foam has set, the molded article is removed from the mold. A longitudinal trench 15 (the length direction being perpendicular to FIG. 3) is formed in the outside surface of the molded article, which trench has a shape substantially complementary to the shape of the rail 12. The foam extends all the way around the overmolded element 1 except over its inside faces below the end edges and except over the bottom of the open internal space. In particular, the foam extends until it covers the top surfaces of the two side walls 3 and 4 to the innermost points 5 and 6 of the top edges of the two walls. The foam defines two vertical faces 50 and 51 of the trench, which vertical faces extend from the top opening of the trench that opens out onto the outside of the molded article to the respective top edges of the walls 3 and 4 forming the branches of the U-shape of the overmolded article. The hook-free end segments of the inside surface of the overmolded article are substantially parallel and in continuity with the vertical faces 50 and 51. The transition from the vertical faces 50 and 51 to the respective inside segments takes place smoothly, without any unevenness, in particular at the join.

Figure 3B:
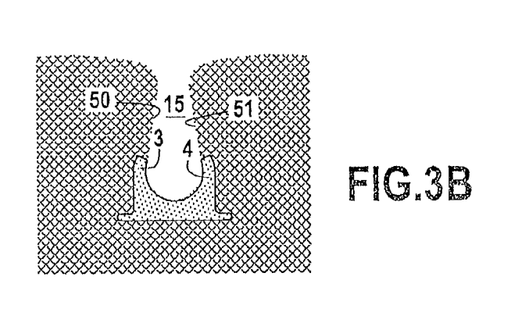
Figure 3C:
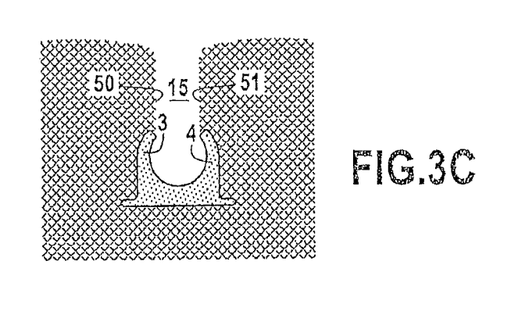

FIGS. 3A, 3B, and 3C show portions of respective resulting molded articles. Naturally, depending on the molded article, it is possible to provide a plurality of trenches of this type, each of which is provided with at least one element having hooks of the invention. In particular, it is possible to provide a pedestal of very long length that is clamped by a plurality of spaced-apart overmolded elements in order to obtain a trench having a plurality of spaced-apart overmolded elements at its bottom.

Once the molding of the foam article including one or more overmolded elements having hooks is finished, and, in particular, when the molded article is a motor vehicle cushion, it then needs to be covered with a cover. This cover is connected to elements having loops that come to co-operate with the hooks to fasten the cover to the molded article while covering it, in particular by fitting snugly over the shape of its outside surface.

Figure 6:
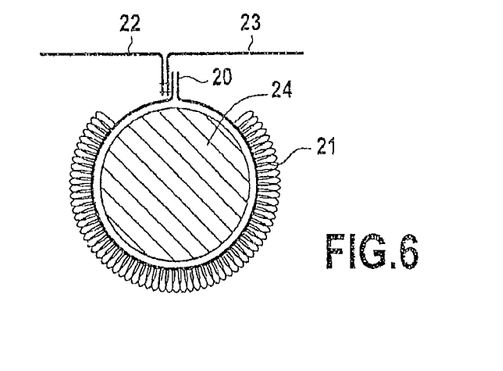
FIG. 6 is a cross-section view of an element having loops of an assembly of the invention, stemming from a cover designed to cover the molded article of FIG. 3.
Figure 13:
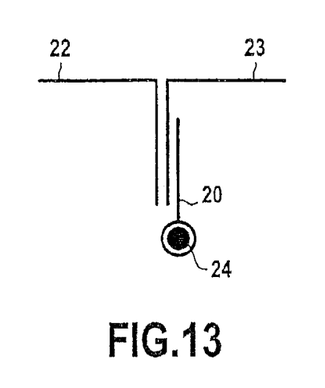
FIG. 13 is a diagrammatic section view of an embodiment of a cover for covering a molded article of the invention.
Figure 14:
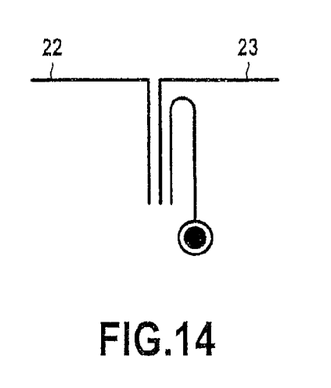
FIG. 14 is a diagrammatic section view of another embodiment of a cover for covering a molded article of the invention.

An element having loops of this type is shown in FIG. 6. It is provided with a pocket 20 constituted by a sheet of textile material folded over onto itself, loops stemming from the outside surface of the resulting tube. These loops 21 may, in particular, have been woven or knitted into the outside surface of the pocket 20. Two pieces in the shape of sheets 22 and 23 forming the cover are superposed at their edges and the pocket is sewn to the side (see FIGS. 13 and 14) of the two edges so as thus to join the two sheets 22 and 23 to form the cover. Thus, the pocket 20 that lies at the join between the two sheets 22 and 23 is inserted into the bottom of the trench 15 so that the loops come into contact with the hooks so as thus to fasten the cover 22 around the molded article, in particular along the outlines and the walls of the trench 15.

Figure 7:
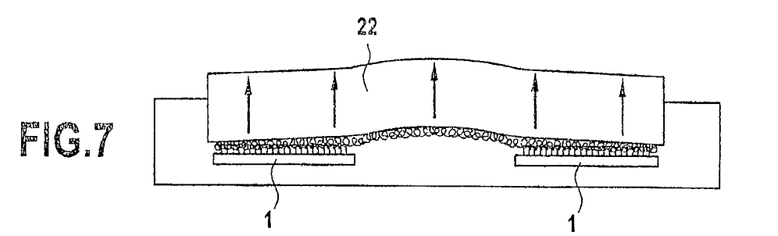
FIGS. 7 and 8 diagrammatically show how the element having loops and the element having hooks cooperate at the bottom of the trench in the molded article of FIG. 3 when it is covered by a cover including the element having loops of FIG. 6, when (FIG. 8) the wire made of a rigid plastics material is inserted in the pocket, and when (FIG. 7) it is not inserted therein.
Figure 8:
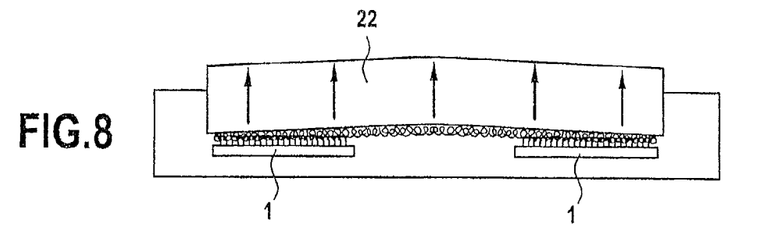

FIGS. 7 and 8 show side views (with the molded article having been omitted) of the fastening between the hooks and the loops. Two overmolded elements 1 having hooks have been placed at the bottom of the trench by way of illustration. Naturally, the trench may extend lengthwise over a longer distance in order to provide more than two elements having hooks therein.

In addition, a wire 24 constituted by a circularly cylindrical bar of rigid plastics material has been inserted into the pocket 20 of the element having loops in order to stiffen the overall assembly. The rigid wire of plastics material is, for example, made of polypropylene (PP) or of polyethylene (PE), and has a diameter of at least 2 mm, and in particular a diameter lying in the range 2 mm to 10 mm. However, it is also possible to provide a hollow wire, i.e. a tube-shaped wire. When the rigid wire 24 is not present inside the textile pocket 20, then, in the intermediate zone between the two elements 1 having hooks, a riding-up effect occurs in that the pocket rides up, i.e. arches, so as to deform in the manner of a tent, as shown in FIG. 7.

Conversely, when the rigid wire 24 of plastics material is placed inside the pocket 20, the riding-up effect disappears, as shown in FIG. 8. Thus, the two elements 1 shown in FIG. 7 are spaced apart at a distance such that, when there is no wire 24, there is a riding-up effect and when there is a wire 24 inserted inside the pocket 20, there is no riding-up effect. In particular, this distance may correspond to a distance greater than in the range 20 mm to 25 mm, given that it can easily reach 80 mm, or indeed in the range 150 mm to 200 mm.

As indicated, in FIG. 4A, the thickness of the rail 12 preferably lies in the range 8 mm to 16 mm, and more preferably in the range 9 mm to 12 mm. These ranges of thickness dimensions are, however, also valid for the other embodiments shown in the drawings.

Figure 4B:
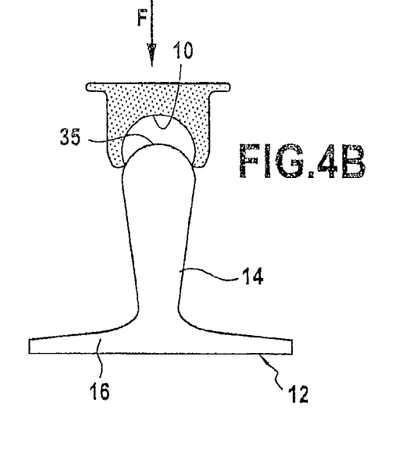

In the embodiment corresponding to FIGS. 3B, 4B, and 5B, the pedestal tapers going downwards (i.e. in the direction indicated by the arrow F). This results in a trench shown in FIG. 3B that has its width tapering towards the top opening. As in the embodiment of FIG. 3A however, the innermost points 5 and 6 of the top edges of the two walls do not stand proud from the two faces 50 and 51 of the groove 50. The same applies in the embodiment shown in FIG. 3C.

Figure 11:
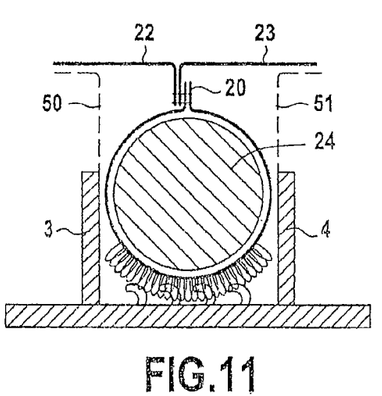
FIG. 11 is a section view through a trench of the molded article of an assembly of the invention.

FIG. 11 shows the assembly of FIG. 8 in a cross-section through the trench. The width of the trench is measured horizontally to the figure. The sum of the diameter of the wire and of twice the thickness of the sheet folded over onto itself to form the pocket is substantially equal to the width of the trench. In particular, the pocket and each wall of the trench come flush with each other. Dashed lines are used to show the foam of which the molded article is molded, and in particular the two vertical surfaces 50 and 51 formed by the foam between the opening of the trench that opens out to the outside of the article and the top edges of the two walls 3 and 4 that are, in this example, also vertical walls.

In all of the embodiments shown, the foam covers all or substantially all of the surfaces of the top edges of the walls of the overmolded element that form the branches of the U-shape, i.e. to the innermost points 5 and 6.

Figure 12:
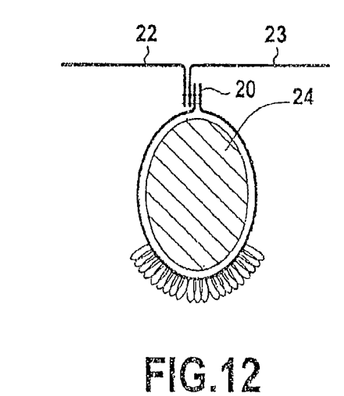
FIG. 12 is a view identical to FIG. 11 of another embodiment of an assembly of the invention.

FIG. 12 shows another embodiment in which the wire is of oval or elliptical section having its major axis extending in the direction vertical to the figure, i.e. from the bottom of the trench towards the outside. The total width of the element having loops (dimension along the minor axis and twice the thickness of the pocket) is substantially equal to the width dimension of the trench.

Figure 15:
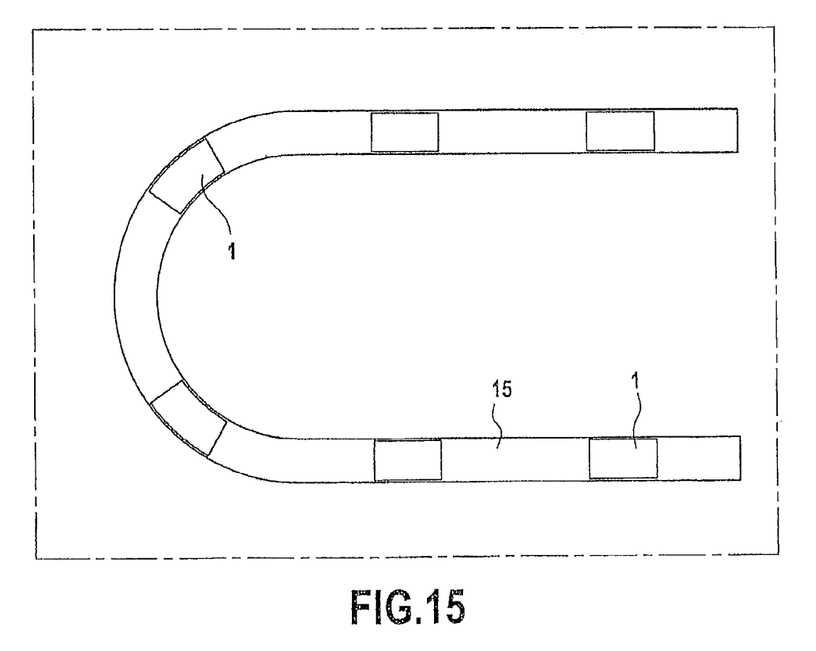
FIG. 15 is a view of a molded article, above a trench which, in this embodiment, is made up of curved segments and of straight segments.

FIG. 15 shows an embodiment of a molded article having a trench extending non-straightly, and, in particular, including curved segments. Since the overmolded elements do not need to be placed continuously, and in particular end-to-end in the trench, the assembly is simplified and in particular it is not necessary to provide overmolded elements of curved shape complementary to the shape of the curved segment of the trench, the same elements of short length and spaced a long way apart used in the straight segments also being suitable in curved segments of low curvature.

In the present Application, the term "hook" means any element having the capacity to hook, in particular into a loop. In particular, a hook is an element comprising a shank and a head projecting laterally from said shank. Thus, elements in the shapes of a mushroom, of a barb, of a double head, or of some other analogous type are hooks in the meaning of the invention.

In the present Application, a first aspect of the invention is described in which a plurality of overmolded elements are provided. An example of an overmolded element in this first aspect is given in the figures. However, within the ambit of this first aspect, it is possible to provide other types of overmolded elements, e.g. mere strips having hooks, overmolded by means of a prior art system in which a cavity is formed for protecting the hooks at the bottom of the mold, or indeed by using a mere protective cocoon for protecting the hooks from the poured foam.

In the second and third aspects of the invention, the mutual fastening between the molded article and the cover is described as being by hooks stemming from the molded article co-operating with loops on the cover. It should be noted that it is also possible to provide hooks instead of the loops, which hooks then co-operate with the hooks on the overmolded elements in the manner of a hook-in-hook self-fastener, and that is why, in these second and third aspects of the invention, the term "loop" should be understood in a broader acceptation that also encompasses the fact that the loops may be hooks. Conversely, in the first aspect, the term "loop" implies the existence of an opening through which a hooking element can pass and be hooked.

Similarly, within the ambit of the second aspect, it is possible to make provision for it to be used with a single overmolded element or with a plurality of such elements over any given pedestal, in which case it is possible to place them some distance apart from one another (this then lies within the ambit of the first aspect of the invention) or, very close together, or indeed end-to-end if so desired.

The invention claimed is:

1. An assembly comprising a molded article and a cover that covers the outside surface of the molded article at least in part, at least one longitudinal groove or trench being formed in the molded article while being open to the outside, at least two overmolded elements having hooks being overmolded in the molded article so as to form the bottom of the groove at least in part, at least some hooks penetrating into openings in loops stemming from the cover so as to hook therein and thereby fasten the cover to the molded article, wherein the two overmolded elements are placed one behind the other in the longitudinal direction and are separated from each other by an intermediate zone in which there is no element having hooks, and an anti riding-up system is provided for preventing the cover from riding up towards the top of the groove.

2. The assembly according to claim 1, wherein the loops stem from the outside surface of a pocket fastened to the cover, and the anti riding-up system for preventing the riding-up effect comprises a wire that extends inside the pocket.

3. The assembly according to claim 2, wherein the length of the intermediate zone, i.e. the distance between the two successive adjacent overmolded elements in the longitudinal direction, is such that, without the wire, a riding-up effect appears; and the material and the dimensions of the wire are such that it is sufficiently rigid for the riding-up effect to be smaller when it is received in the pocket.

4. The assembly according to claim 2, wherein the loops stem from the bottom portion of the periphery of the pocket.

5. The assembly according to claim 2, wherein the wire has a rectangular cross-section, the corners of which are rounded.

6. The assembly according to claim 5, wherein the wire is arranged in the groove such that the length of its rectangular cross-section extends in the direction going from the bottom of the groove towards the outside.

7. The assembly according to claim 2, wherein the wire has a cross-section that is of oval shape.

8. The assembly according to claim 7, wherein the wire is arranged in the groove such that the major axis of its oval-shaped cross-section extends in the direction going from the bottom of the groove towards the outside.

9. The assembly according to claim 2, wherein the length of the intermediate zone, defined by a distance between the two successive adjacent overmolded elements in the longitudinal direction, is such that, without the wire, a riding-up effect appears, and the material and the dimensions of the wire are such that it is sufficiently rigid to prevent any riding-up effect when it is received in the pocket.

10. The assembly according to claim 1, wherein in cross-section, each overmolded element having hooks has a U-shape or a C-shape, the two branches of which shape extend towards the outside of the groove, the inside surface of the U-shape or of the C-shape having two distal end segments from which no hook projects, and an intermediate bottom segment from which the hooks of the overmolded element having hooks project.

11. The assembly according to claim 10, wherein the groove has two side faces formed by the material of which the molded article is molded, which faces extend from the opening to the respective distal edges of the branches of the U-shape or of the C-shape of each overmolded element having hooks and the respective inside surfaces of the two branches of the U-shape or of the C-shape are flush with the respective side faces.

12. The assembly according to claim 11, wherein the side faces of the groove are at least in part straight and come into register with the inside top edges of the respective branches of the U-shape or of the C-shape.

13. The assembly according to claim 10, wherein the distance between the respective innermost points of the top edges of the two branches of the U-shape or of the C-shape of each overmolded element is substantially equal to the width dimension of the element having loops excluding the loops, i.e. the sum of the width dimension of the wire and of twice the thickness of the pocket excluding the loops, while nevertheless being just greater than this width dimension.

14. The assembly according to claim 1, wherein the groove includes at least one segment of curved shape in which at least one overmolded element extends that is of straight or curved shape, the length of the overmolded element being less than the length of the curved segment.

15. The assembly according to claim 1, wherein the anti riding-up system is adapted to prevent the cover from riding up towards the top of the groove at the intermediate zone.

* * * * *